Sept. 2, 1941.　　　T. KAUKEWITSCH　　　2,254,896
METHOD AND MEANS FOR ADDING LARGE LOADS TO IDLING GENERATORS
Filed March 7, 1940　　　2 Sheets-Sheet 1

WITNESSES:

INVENTOR
Theodor Kaukewitsch
BY
Paul E. Friedmann
ATTORNEY

Sept. 2, 1941.    T. KAUKEWITSCH    2,254,896
METHOD AND MEANS FOR ADDING LARGE LOADS TO IDLING GENERATORS
Filed March 7, 1940    2 Sheets-Sheet 2

WITNESSES:

INVENTOR
Theodor Kaukewitsch
BY
ATTORNEY

Patented Sept. 2, 1941

2,254,896

UNITED STATES PATENT OFFICE 2,254,896

METHOD AND MEANS FOR ADDING LARGE LOADS TO IDLING GENERATORS

Theodor Kaukewitsch, Berlin-Siemensstadt, Germany, assignor to Westinghouse Electric & Manufacturing Company, East Pittsburgh, Pa., a corporation of Pennsylvania Application March 7, 1940, Serial No. 322,782
In Germany March 15, 1938

4 Claims. (Cl. 171—119)

When a relatively large load is connected to an idling generator, it is known that large voltage fluctuations are produced. This is especially pronounced when loads are connected to an alternator, which loads have wattless components of load, as is known for instance, for induction motors, transformers, and similar devices. This voltage fluctuation, or line surge, may cause undesirable disturbance to the electromagnetic interconnecting means and other electrical devices connected to the generator.

The reason for such voltage surges is in large measure caused by the low excitation of the generator just prior to the connection of the load to the generator, since the excitation will be just sufficient to produce the full no-load voltage. At the moment the load is connected to the generator, this excitation no longer suffices to cover both the excitation for the higher useful loads and also the higher wattless component. A relatively long time thus elapses before the voltage regulator is again able to provide stable operation, since such regulators do not and cannot anticipate the rise in load, but go into action only after the load has risen.

To prevent such voltage surges because of the connection of a load to a generator, it is desirable that the field excitation be increased just sufficient to compensate for the rise in load. To accomplish this, devices have heretofore been proposed for strengthening the excitation prior to the application of the load. These devices, however, have the disadvantage of producing an undesired and harmful voltage rise.

One object of the invention is to produce a smooth transition from an operation of a generator without interconnection with the load to be operated to an operation of the generator with load connected to the generator.

Another object of the invention is to prevent voltage surges on a generator during connection of a relatively large load to the generator.

A still further object of the invention is to prevent both a rise of voltage of a generator just prior to the connection of a useful load to it, and a decrease of voltage right after the useful load is connected to it.

Other objects and advantages will become more apparent from a study of the following description, or specification, when read in conjunction with the accompanying drawings, in which.

In the invention, I provide a generator with a wattless load which will produce an increased generator excitation comparable to the increase that would be required upon connection of the load to the generator, and simultaneously with the connection of the load to the generator disconnect the wattless load. In other words, I avoid the rise in voltage by using the increased generator excitation to supply a wattless load on the generator, then simultaneously disconnect the wattless load and connect the useful load.

The production of a wattless load may be produced by either short circuiting the generator or connecting an inductive load to the generator prior to the connection of the useful load to the generator. By this scheme, I provide an existing or immediately available desired high generator excitation during the transition. The transition from one generator connection to the connection of the useful load thus proceeds with the greatest dispatch and without disturbance.

Figure 1:
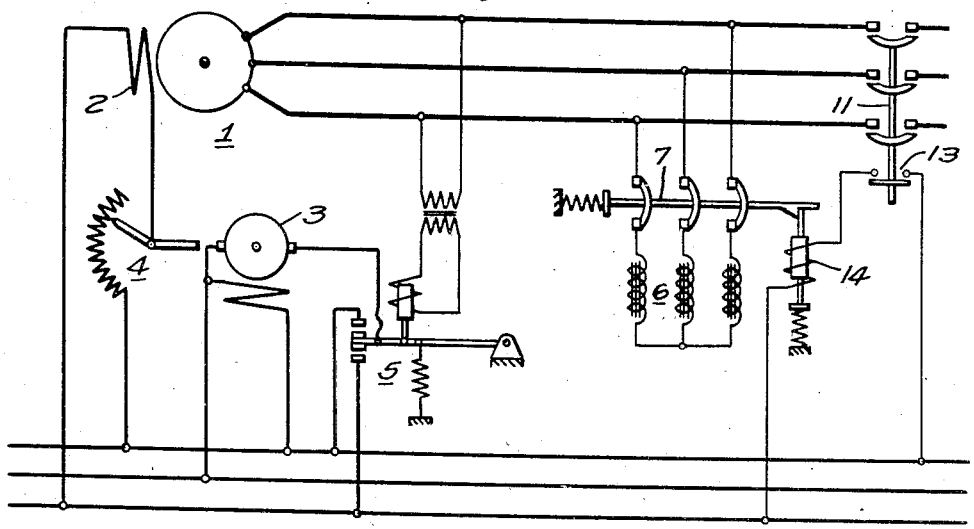
Figure 1 shows a diagrammatic embodiment of the invention.

In Fig. 1 the generator is designated by reference character 1 having a field winding 2, a motor 3 for operating the field rheostat 4 and a voltage regulator 5, responsive to the generator voltage for maintaining the generator voltage constant.

Connected directly to the generator 1 by circuit breaker 7 is a saturated reactor 6. This reactor may be replaced by a transformer, or other device, giving the required wattless load to the generator 1. Since the voltage regulator, operating on motor 3 which in turn controls the resistance of the generator field circuit through operation of rheostat 4, tends to keep the generator voltage constant at a selected value, the generator field excitation is set at a high value.

Upon operation of the circuit breaker 11, the switch 13 is closed and the tripping coil 14 is energized. The reactive load 6 is thus disconnected from the generator substantially at the same instant the useful load is connected to the generator.

Figure 2:
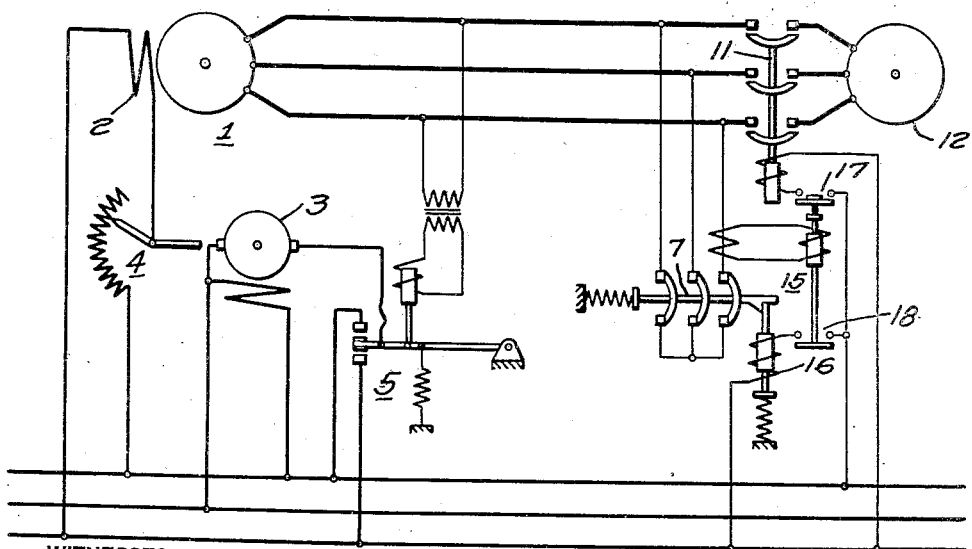
Fig. 2 shows, diagrammatically, a modification of the invention.

In Fig. 2, like parts are designated by the same reference characters used in Fig. 1. In this modification, the generator 1 is short-circuited by the circuit breaker 7. After the circuit breaker 7 is closed, the effect of the voltage regulator will be to increase the generator excitation to produce full voltage at the generator terminals; but for generator short-circuit conditions, this means that the generator excitation will be a maximum. The short-circuit current will rise, and at a given value, the current responsive relay 15 will, substantially simultaneously, connect the motor 12 to the generator 1 and energize the trip coil 16 of the circuit breaker.

The preferred arrangement may be such that the motor 12 is connected to the generator 1 an instant before the circuit breaker 7 opens. This is accomplished by so positioning the contacts 17 of relay 15 that they close before the contacts 18 close. Note the showing in Fig. 2.

The generator thus, at the instant of the connection of the motor 12 to it, has a considerable reserve stored energy for the wattless power needed during acceleration of motor 12. An excessive rise in voltage is thus avoided and further, the motor smoothly gets up to full speed while the regulator, at the same time, decreases the generator excitation to normal full load operation.

Figure 3:
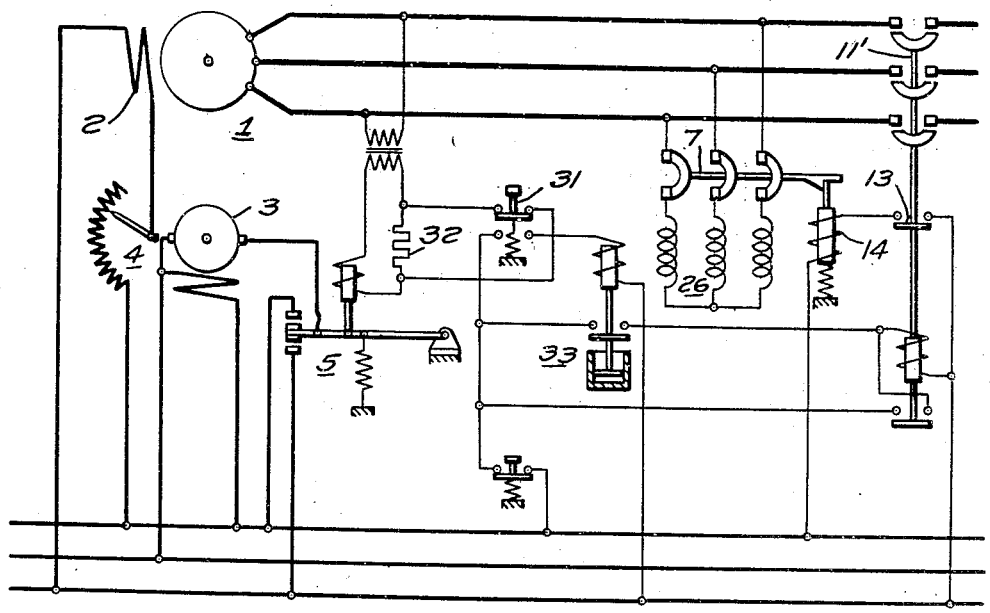
Fig. 3 shows, diagrammatically, a still further modification of the invention.
Figure 4:
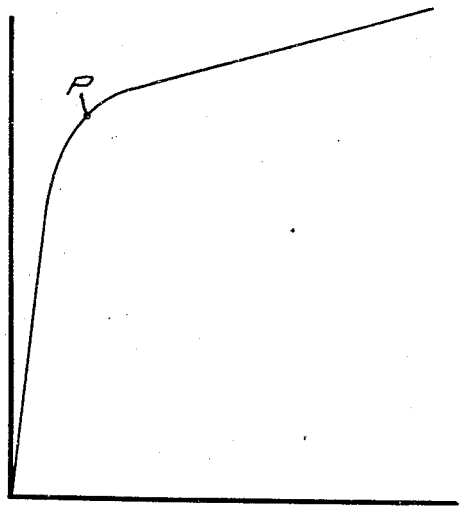
Fig. 4 shows at which point on the saturation curve the inductive, or reactive, load device shown with the generator of Fig. 3, is to be operated.

For the modification shown in Fig. 3, the advantages of the invention already stated, and still others, are obtained. The reactor 26 in this showing is so designed that its magnetization will be at point P (see Fig. 4) of its saturation curve when the generator excitation is set at normal full load excitation by the regulator 5. Since the point P is at the bend of the curve, any effort on the part of the regulator 5 to maintain constant terminal voltage for the generator will necessitate a considerable rise in generator excitation to take care of rapidly rising wattless power consumption of the reactor.

In the modification shown in Fig. 3, I provide, just before the useful load is to be connected to the generator for temporarily increasing the generator excitation. At the instant the load is connected to the generator the reactor is disconnected from it. The stored energy in the generator for supplying the wattless power to the reactor is thus available to supply the wattless load of the motor during acceleration.

By the time the motor is up to speed, its wattless power required during acceleration is very materially decreased and the excess energy available in the generator just prior to the connection of the load to the motor has been used up. The regulator has in the meantime, reestablished normal excitation. The connection of the load to the generator is thus not accompanied by any voltage surges.

The operation of the modification shown in Fig. 3 is briefly as follows. The attendant operates the starting push button switch 31. This operation places the resistor 32 in the regulator circuit so that the regulator 5 immediately operates to effect a rise in generator excitation through the operation of motor 3 on rheostat 4. Since the reactor is already operating at point P, see Fig. 4, the excitation rise will thus be considerable in view of the characteristics of the reactor connected to the generator, yet there will be no appreciable rise in terminal voltage.

Operation of switch 31 also energizes the time limit device 33, which after a short time interval sufficient for the regulator to effect an excitation rise, energizes the main circuit breaker 11'. Operation of the breaker 11' causes disconnection of the reactor 26 from the generator. Since the attendant releases switch 31 the instant breaker 11' operates the regulator is set for normal operation and the excitation is correspondingly adjusted.

I am, of course, aware that others skilled in the art, particularly after having had the benefit of the disclosure, may devise similar control systems. I, therefore, do not wish to be limited to the specific showing made, but wish to be limited by the appended claims and such prior art as may be pertinent.

I claim as my invention:

1. In a system of control, in combination, an alternator, a voltage regulator therefor, a reactive load, means for connecting said reactive load to the alternator, said reactive load operating at the knee of its saturation curve when the alternator is excited at a value substantially equal to the excitation required for normal voltage of the alternator at full load, switching means for connecting a normal full load to the alternator, switching means for disconnecting the reactive load from the alternator and means responsive to certain current characteristics of said alternator for effecting operation of said two switching means.

2. In a system of control, in combination, an alternator, a voltage regulator therefor, a reactive load connected to the alternator, said reactive load operating at the knee of its saturation curve when the alternator is excited at a value substantially equal to the excitation required for normal voltage of the alternator at full load, means for simulating a voltage decrease of the alternator for the regulator, whereby the regulator increases the alternator excitation, a useful load, means for connecting the useful load to the alternator a predetermined time interval after the alternator excitation is increased, and means for disconnecting the reactive load from the alternator when the useful load is connected to the alternator.

3. In a system of control, in combination, an alternator, a voltage regulator for varying the excitation of said alternator, spurious load means for loading said alternator to thus influence the voltage regulator so that the regulator effects an increase in excitation of the alternator, switching means for connecting a normal, or genuine, load to the alternator, and control means operable at certain current characteristics of the alternator, for effecting the operation of said switching means to thus connect the normal load to the alternator and also to disconnect the spurious load means from the alternator.

4. In a system of control, in combination, an alternator, a voltage regulator for varying the excitation of said alternator, spurious load means for loading said alternator to thus influence the voltage regulator so that the regulator effects an increase in excitation of the alternator, switching means for connecting a normal, or genuine, load to the alternator, control means operable at certain current characteristics of the alternator, and time limit means, responsive to said control means after a definite time interval and effecting the operation of said switching means to thus connect the normal load to said alternator and also to disconnect the spurious load means from the alternator.

THEODOR KAUKEWITSCH.